United States Patent [19]

Ishida et al.

[11] Patent Number: 4,959,680

[45] Date of Patent: Sep. 25, 1990

[54] CAMERA SYSTEM

[75] Inventors: Hiroaki Ishida; Ichiro Nemoto; Koji Sato; Atsushi Takami; Yoichi Nakano; Isamu Ishii; Yoshiyuki Iwamatsu, all of Chiba, Japan

[73] Assignee: Seikosha Co., Ltd., Tokyo, Japan

[21] Appl. No.: 372,729

[22] Filed: Jun. 28, 1989

[30] Foreign Application Priority Data

Jun. 29, 1988 [JP] Japan .................................. 63-161308
Jul. 4, 1988 [JP] Japan .................................. 63-166398

[51] Int. Cl.$^5$ ............................ G03B 7/00; G03B 9/00
[52] U.S. Cl. .................................... 354/435; 354/441; 354/236; 354/233
[58] Field of Search ............... 354/442, 441, 435, 436, 354/437, 438, 439, 412, 236, 231, 226, 233

[56] References Cited

U.S. PATENT DOCUMENTS

4,166,685 9/1979 Hashimoto ......................... 354/236
4,200,385 4/1980 Shono ................................. 354/236

Primary Examiner—L. T. Hix
Assistant Examiner—Cassandra C. Spyrou
Attorney, Agent, or Firm—Jordan & Hamburg

[57] ABSTRACT

A camera system of the type having a lens shutter, a focal-plane shutter, an aperture defined by the lens shutter, and a camera lens, includes a selector circuit which sets an operation mode to either a lens shutter mode in which the lens shutter is operated as a programmed shutter or a focal-plane shutter mode in which the shutter speed is controlled by the focal-plane shutter and the aperture of the camera system is controlled by the lens shutter; a first driving system which controls the lens shutter; a second driving system which controls the time during which the focal-plane shutter is operated; a sequential control circuit which controls the timing of the first and second driving systems; a setting circuit which sets the focal length of the camera lens; an arithmetic circuit which produces an output signal in response to the brightness of the subject, the distance to the subject, the focal length of the lens and the sensitivity of the film; and a switching circuit which switches the operation mode to the focal-plane shutter mode irrespective of the setting of the selector circuit when the exposure value to be controlled exceeds the programmed exposure value of the lens shutter and for switching either the operation mode or the shutter speed in accordance with the set focal length to prevent photographic blurring during camera shake, in response to the output from the arithmetic circuit.

13 Claims, 5 Drawing Sheets

CAMERA SYSTEM

BACKGROUND OF THE INVENTION

The present invention relates generally to a camera system, and more particularly, is directed to a camera system equipped with both a lens shutter and a focal-plane shutter.

Cameras equipped with a lens shutter and cameras equipped with a focal-place shutter are well-known.

A camera equipped with a lens shutter is adapted for flash photography because of the shape of the shutter opening. On the other hand, the lens of a camera equipped with a focal-place shutter can be replaced because of the light-blocking structure of the focal-plane shutter. In addition, the lens of a camera equipped with a focal-plane shutter permits high-speed time control because of the manner of operation thereof.

In an attempt to combine the features of the aforementioned two cameras, it has been proposed to use an interchangeable lens having a lens shutter in a camera equipped with a focal-plane shutter. In such case, the lens shutter operates as an interchangeable lens, alone and independently of the focal-plane shutter. Because of such independent operation, separate control sections are installed in the camera for the focal-plane shutter and the lens shutter, respectively. However, the use of two separate control sections becomes complicated, costly and wasteful.

Further, it is known that the brightness of a subject to be photographed can be controlled by a lens shutter up to an exposure value (EV or LV) of approximately LV17 or EV17. In other words, it is difficult for a lens shutter to operate at high speeds. This is because diffraction is created by the lens when the size of the aperture is reduced.

Thus, in cameras having a lens shutter, the brightness limit of approximately LV17 is set in the camera such that exposure comparable to a pin hole is not provided. Consequently, when the brightness of the subject to be photographed exceeds the aforementioned limit, no appropriate exposure value is obtained. In such case, when the brightness level exceeds the aforementioned limit of the lens shutter, the lens must be replaced with an interchangeable lens incorporating only a diaphragm. Accordingly, photographs are taken while utilizing the combination of the high-speed operation of the focal-plane shutter and the replaced lens. However, it is difficult and cumbersome to perform a photography operation in such circumstances.

It is also known to provide a camera equipped with a zoom lens and a multifocus lens, that is, with the multifocus lens including a telephoto (long-focus length) lens and a wide-angle (short-focus length) lens. When the telephoto lens is used, the image of the subject is enlarged so that only the region in which the photographer has an interest is photographed. However, with a telephoto lens, the f-number increases, thereby darkening the lens. As a result, the diaphragm must be opened or the shutter speed must be lowered to provide adequate exposure. It is also noted that the use of a telephoto lens shortens the slowest shutter speed at which camera shake will not pose a problem. For example, when a lens has a focal length of 100 mm, the shutter speed will be approximately 1/100 second. When the shutter speed is lower than this value, camera shake will blur the photograph.

SUMMARY OF THE INVENTION

Accordingly, it is an object of the present invention to provide a camera system that overcomes the aforementioned problems with the prior art.

It is another object of the present invention to provide a camera system which is equipped with both a lens shutter and a focal-plane shutter.

It is still another object of the present invention to provide a camera system in which the focal-plane shutter is automatically selected if the brightness of the subject to be photographed exceeds the limit of operation of the lens shutter.

It is yet another object of the present invention to provide a camera system in which the photographable range of brightness is extended.

It is a further object of the present invention to provide a camera system which automatically switches the operation between the lens shutter and the focal-plane shutter, or varies the shutter speed to a speed at which camera shake does not present a problem, in accordance with the set focal length of the camera lens.

In accordance with an aspect of the present invention, a camera system of the type having a lens shutter for performing a programmed exposure operation with a programmed exposure value and a diaphragm-adjusting operation, a focal-plane shutter and an aperture defined by the lens shutter and through which an image of a subject to be photographed is passed for recording on a photosensitive material, includes selector means for setting an operation mode of the camera system to a lens shutter mode in which the lens shutter is operated as a programmed shutter, or a focal-plane shutter mode in which shutter speed is controlled by the focal-plane shutter and the aperture of the camera system is controlled by the lens shutter; and switching means for switching the operation mode of the camera system to the focal-plane shutter mode irrespective of the setting of the selector means when an exposure value to be controlled exceeds the programmed exposure value of the lens shutter.

In accordance with another aspect of the present invention, a camera system of the type having a lens shutter for performing a programmed exposure operation with a programmed exposure value and a diaphragm-adjusting operation, a focal-plane shutter, an aperture through which an image of a subject to be photographed is passed for recording on a photosensitive material and a camera lens, includes selector means for setting an operation mode of the camera system to a lens shutter mode in which the lens shutter is operated as a programmed shutter, or a focal-plane shutter mode in which shutter speed is controlled by the focal-plane shutter and the aperture of the camera system is controlled by the lens shutter; setting means for setting the focal length of the camera lens; and switching means for switching either the operation mode of the camera system from one mode to the other mode, or the shutter speed of the camera system set by the selector means to another shutter speed, in accordance with the focal length set by the setting means, to prevent photographic blurring during camera shake.

In accordance with still another aspect of the present invention, a camera system of the type having a lens shutter for performing a programmed exposure operation with a programmed exposure value and a diaphragm-adjusting operation, a focal-plane shutter, an aperture through which an image of a subject to be photographed is passed for recording on a photosensitive material and a camera lens, includes selector means for setting an operation mode of the camera system to a lens shutter mode in which the lens shutter is operated as a programmed shutter, or a focal-plane shutter mode in which shutter speed is controlled by the focal-plane shutter and the aperture of the camera system is controlled by the lens shutter; setting means for setting the focal length of the camera lens; and switching means for switching the operation mode of the camera system to the focal-plane shutter mode irrespective of the setting of the selector means when an exposure value to be controlled exceeds the programmed exposure value of the lens shutter, and for switching either the operation mode of the camera system from one mode to the other mode, or the shutter speed of the camera system set by the selector means to another shutter speed, in accordance with the focal length set by the setting means, to prevent photographic blurring during camera shake.

The above and other objects, features, and advantages of the present invention will become readily apparent from the following detailed description thereof which is to be read in connection with the accompanying drawings.

BRIEF DESCRIPTION OF THE DRAWINGS

FIG. 7 is a graphical diagram illustrating still another programmed operation performed by the control circuit of FIG. 6.

DETAILED DESCRIPTION OF THE INVENTION

Figure 1:
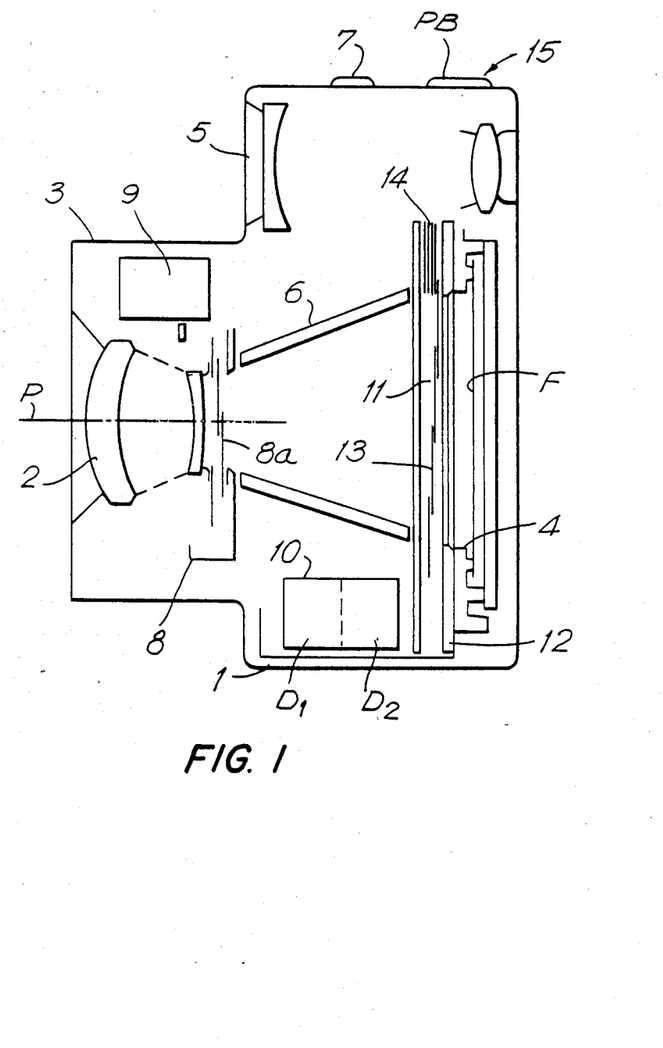
FIG. 1 is a schematic cross-sectional view of a camera according to the present invention.

Referring to the drawings in detail, and initially to FIG. 1 thereof, a camera according to one embodiment of the present invention includes a camera body 1 having a lens barrel 3 mounted thereto. A lens 2 is held to lens barrel 3. The image of a subject to be photographed passes through lens 2 and is focused onto a photo-sensitive material F (hereinafter referred to as the film) which is located behind the limits of the field of view 4.

A viewfinder 5 is mounted at the upper portion of camera body 1 and enables the camera operator to define the field of view 4. In addition, a shade cylinder 6 is mounted at an upper portion of camera body 1 and functions to shield the film against deleterious light emanating from portions of the camera other than lens 2. A push-button shutter release 7 for initiating a photographing operation is mounted on the upper surface of camera body 1 and is depressed by the camera operator in order to initiate the photographing operation.

As is conventional, a lens shutter 8 for opening and closing the lens opening or aperture to enable light from the image to be photographed, to pass to the film, is disposed behind lens 2. In effect, lens shutter 8 thereby defines the lens aperture. Lens shutter 8 includes blades 8a which are moved to open and close the lens opening, blades 8a normally being operated to close the shutter opening. In addition, blades 8a function as a diaphragm. A stepper motor 9 is positioned in camera body 1 for opening and closing the lens opening. As shown in FIG. 1, and as will be described in greater detail hereinafter with respect to FIG. 2, an electronic circuit 10 is provided in camera body 1 and includes a first driving means D1 for controlling the operation of stepper motor 9.

In addition to the above shutter lens arrangement, a focal-plane shutter 11 is provided in camera body 1 and includes a first blind 13 and a second blind 14, as is conventional, both blinds 13 and 14 being held to a base 12 mounted to camera body 1. Blinds 13 and 14 operate at a desired interval to control the exposure time in response to energization of two electromagnets (not shown). The two electromagnets are successively energized by a second driving means D2 which forms part of electronic circuit 10 and which will be described in greater detail hereinafter with respect to FIG. 2.

As is conventional, focal-plane shutter 11 is cocked when the film is fed through the camera. However, when a multiple exposure operation is performed, shutter 11 is cocked independent of the transport of the film.

In order for the operator to manually select lens shutter 8 or focal-plane shutter 11 for use in taking a photograph, a selector means 15 is mounted on top of camera body 1 and includes a push-button PB.

Figure 2:
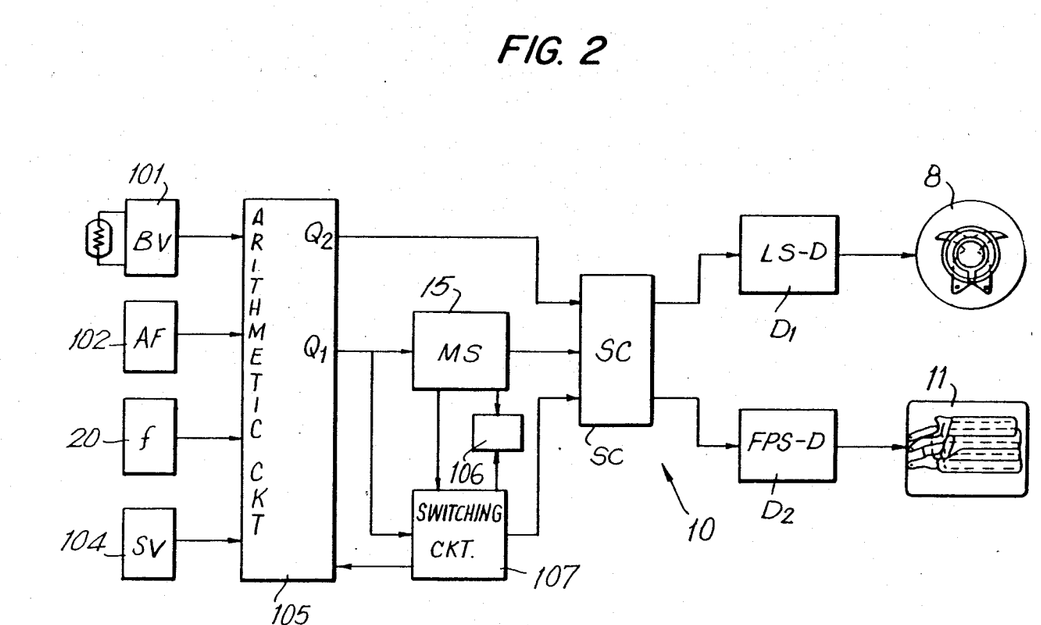
FIG. 2 is a block diagram of a control circuit according to one embodiment of the present invention that can be used with the camera of FIG. 1.

Referring now to FIG. 2, electronic circuit 10 includes a photometric circuit 101 which includes photocells for measuring the brightness of the subject to be photographed, a distance-measuring circuit 102 which measures the distance to the subject, means 20 for setting the focal length f of lens 2 and means 104 for setting the sensitivity or film speed. The output signals from photometric circuit 101, distance-measuring circuit 102 and means 20 and 104 are supplied to an arithmetic circuit 105 which, in turn, supplies output signals to a selector circuit MS of selector means 15, from output Q1 thereof. Sequential control circuit SC controls the timing at which lens shutter 8 and focal-plane shutter 11 are operated.

Selector circuit MS is connected with push-button PB shown in FIG. 1 and determines whether a programmed exposure operation is to be performed by lens shutter 8 or the exposure time is to be controlled by focal-lens shutter 11. Specifically, if push-button PB shown in FIG. 1 is depressed once, the lens shutter mode is set, whereby lens shutter 8 is used. If push-button PB is depressed again, the operation mode of the camera is set to the focal-plane shutter mode in which focal-plane shutter 11 is used. If push-button PB is depressed once again, the operation mode returns to the lens shutter mode. In this regard, push-button PB functions in a similar manner to a toggle switch. For example, the focal plane shutter mode is selected when using a tele-photo lens and the lens shutter mode is selected when using a wide-photo lens.

In addition, a switching circuit 107 is supplied with the output signal from output Q1 of arithmetic circuit 105 and an output signal from selector circuit MS. In accordance with one aspect of the present invention, if the operation mode is set to the lens shutter mode and the subject is so bright so as to exceed the capability, that is, LV 17 of the lens shutter performing a programmed exposure operation, then the operation mode is automatically set to the focal-plane shutter mode by switching circuit 107. In this regard, switching circuit 107 supplies an appropriate output signal to sequential control circuit SC. Further, in response to the set mode of operation, as determined by selector circuit MS and switching circuit 107, arithmetic circuit 105 is supplied with an output from switching circuit 107 and, in return, supplies an output signal from output Q2 thereof to sequential control circuit SC to set the exposure level according to the brightness of the subject to be photographed.

In addition, it is noted that a mode display 106 is connected with selector circuit MS and switching circuit 107, and indicates the set mode of operation. Thus, when the operation mode is set to the focal-plane shutter mode by switching circuit 107, mode display 106 flickers to provide a display of such mode, although any other suitable manner of display can be used.

In response to the signal from selector circuit MS of selector means 15, sequential control circuit SC actuates the first driving means D1 and second driving means D2 with a predetermined timing to activate lens shutter 8 and focal-plane shutter 11, respectively.

Figure 3:
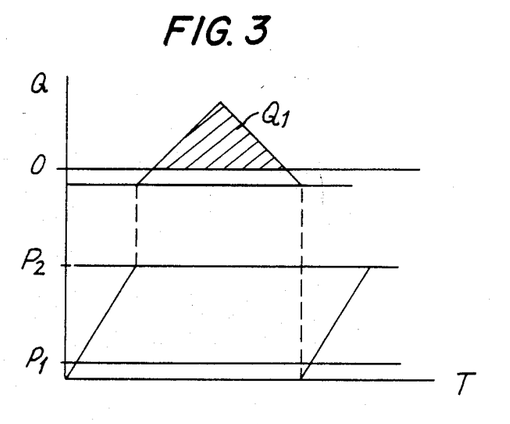
FIG. 3 is a graphical diagram illustrating the operation of the camera of FIG. 1 in the lens shutter mode.
Figure 4:
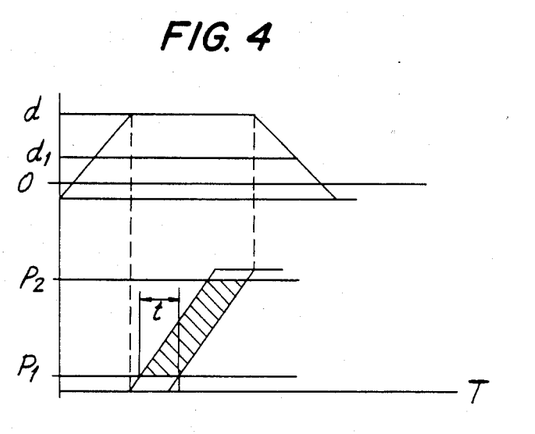
FIG. 4 is a graphical diagram illustrating the operation of the camera of FIG. 1 in the focal-plane shutter mode.

Referring now to FIGS. 3 and 4, the manner in which lens shutter 8 and focal-plane shutter 11 are activated in accordance with the first embodiment of the present invention will now be described in which the exposure value (EV or LV) on the field of view 4 or the position of field of view 4 is plotted as the ordinate versus elapsed time on the abscissa.

A description will first be given of the operation in the lens shutter mode with reference to FIG. 3. When the lens shutter mode is established by push-button PB of selector means 15, the exposure operation is performed by lens shutter 8. Thus, when shutter release 7 is depressed for initiating the photographing operation, sequential control circuit SC first actuates second driving means D2 to produce an output signal which moves first blind 13 of focal-plane shutter 11 from one end P1 of field of view 4 to the opposite end P2 so as to open field of view 4. Then, sequential control circuit SC instructs first driving means D1 to deliver an output signal to stepper motor 9 for activating lens shutter 8. In such case, film F is exposed with an amount of light corresponding to region Q1 in FIG. 3. In this regard, lens shutter 8 is controlled to perform a programmed exposure operation in which the aperture created thereby and the time that the aperture is open are combined in dependence upon the brightness of the subject to be photographed.

Subsequently, sequential control circuit SC activates second driving means D2 to produce an output signal so as to move second blind 14 of focal-plane shutter 11 from one end P1 of field of view 4 to the opposite P2 to thereby close field of view 4.

Upon completion of the operation of focal-plane shutter 11, sequential control circuit SC produces an output signal to wind up film F until the next frame appears. In addition, sequential control circuit SC drives a motor (not shown) to cock focal-plane shutter 11, whereby the photographic operation in the lens shutter mode is completed.

Referring now to FIG. 4, operation of the camera in the focal-plane shutter mode will now be described. The focal-plane shutter mode is established by push-button PB of selector means 15 and the exposure operation is performed by focal-plane shutter 11.

When push-button PB of selector means 15 is depressed so as to select the focal-plane shutter mode and shutter release 7 is also depressed to initiate the photographic operation, sequential control circuit SC activates first driving means D1 to deliver an output signal to stepper motor 9 in order to open lens shutter 8 to a desired aperture d1. In this regard, the lens aperture is in an open condition.

Then, sequential control circuit SC activates second driving means D2 to produce an output signal which successively activates first blind 13 and second blind 14 of focal-plane shutter 11 to expose the film F. At this time, blinds 13 and 14 are operated in an interval t which provides an appropriate amount of exposure, in consideration of the set aperture d1 of lens shutter 8 and in accordance with the brightness of the subject to be photographed. Thereafter, sequential control circuit SC activates first driving means D1 to produce an output signal to close lens shutter 8.

After lens shutter 8 has been closed, sequential control circuit SC delivers an output signal to wind up film F until the next frame appears. At the same time, sequential circuit SC drives a motor (not shown) to cock focal-plane shutter 11, thus completing the photography in the focal-plane shutter mode.

Figure 5:
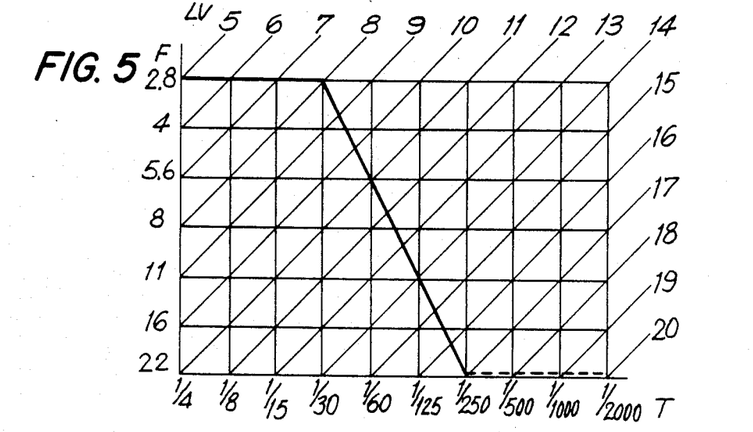
FIG. 5 is a graphical diagram illustrating the programmed operation performed by the control circuit of FIG. 2.

Referring now to FIG. 5, the operation of the camera according to the present invention will now be described in which the operation mode is set to the lens shutter mode by the user by depression of push-button PB of selector means 15, but where the brightness of the subject to be photographed is such that the exposure value LV or EV is greater than the set limit of 17. In such case, since the operational limit of lens shutter 8 is exceeded, lens shutter 8 cannot be used for exposing the photograph. In such case, a programmed exposure operation is taken over by focal-plane shutter 11.

Specifically, selector circuit MS determines whether lens shutter 8 or focal-plane shutter 11 will be used in the photographic operation. When the brightness of the subject to be photographed is so high that the operable limit of lens shutter 8 is exceeded, the operation mode is switched to the focal-plane shutter mode. More particularly, photometric circuit 101 supplies an output signal to arithmetic circuit 105 which, in turn, supplies an appropriate signal corresponding to the brightness of the subject to be photographed to selector circuit MS which, in turn, determines whether the brightness of the subject to be photographed is so high as to exceed the operable limit of lens shutter 8. Then, selector circuit MS supplies an output signal to switching circuit 107 which, in turn, controls sequential control circuit SC to activate lens shutter 8 and focal-plane shutter 11 with suitable respective timings. Consequently, effective use is made of the functions of the two shutters.

Such an operation is shown in FIG. 5 in which operation by lens shutter 8 is indicated by the solid line and the operation effected by focal-plane shutter 11 is indicated by the broken line when the brightness exceeds the operable limit of lens shutter 8.

It will be appreciated that the first embodiment of present invention can be incorporated into a single-lens reflex camera, although the present invention is not so limited.

Figure 6:
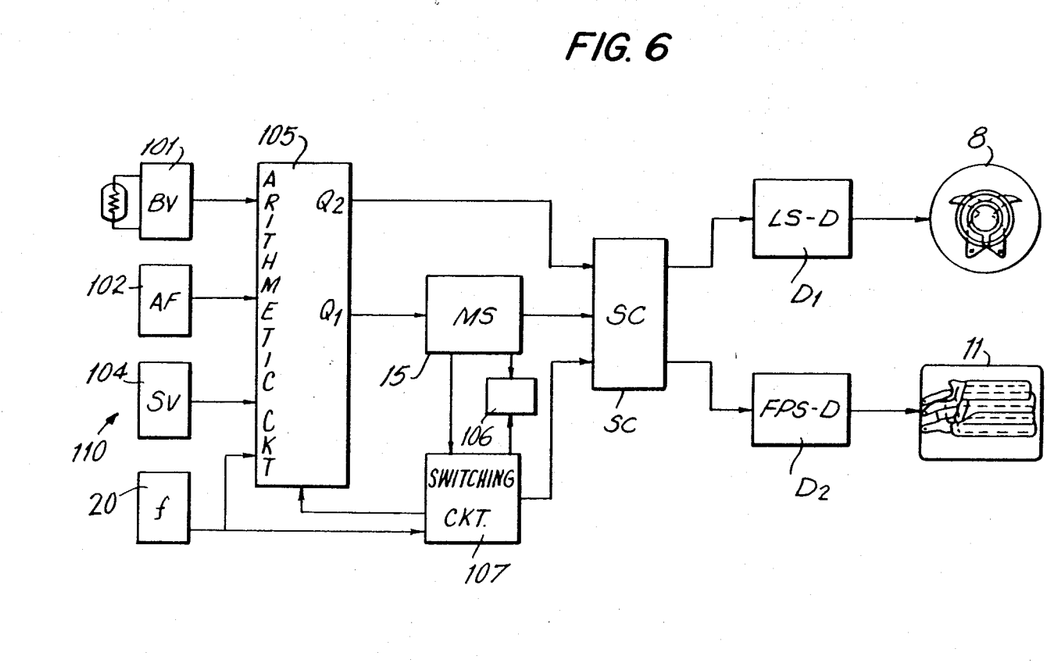
FIG. 6 is a block diagram of a control circuit according to another embodiment of the present invention that can be used with the camera of FIG. 1.

Referring now to FIG. 6, an electronic circuit 110 according to another embodiment of the present invention that can be used with the camera of FIG. 1, will now be described in which elements corresponding to those of electronic circuit 10 of FIG. 2 are identified by the same reference numerals, and a detailed description of such common elements will be omitted herein for the sake of brevity.

Electronic circuit 110 differs from electronic circuit 10 by deleting the connection from output Q1 of arithmetic circuit 105 to switching circuit 107. Instead, the output from focal-length setting means 20 is supplied to both arithmetic circuit 105 and switching circuit 107. In this manner, a signal indicative of the focal length of lens 2, which focal length is set by setting means 20, is supplied to switching circuit 107. Switching circuit 107 includes data of the lowest permissible shutter speed corresponding to the focal length f.

Arithmetic circuit 105 compares the present shutter speed with the lowest permissible shutter speed allowed in the mode set by selector means 15 and stored in switching circuit 107. If the lowest permissible shutter speed is exceeded, then the set mode or shutter speed is forcibly switched to another mode or another shutter speed, in accordance with the focal length set in means 20.

More particularly, it is first assumed that the lens shutter mode is selected by selector means 15. If the brightness of the subject to be photographed is low and if the output Q1 from arithmetic circuit 105 produces an exposure value at which the photograph will be blurred in the presence of camera shake, then a programmed exposure corresponding to a relatively high shutter speed of lens shutter 8 is selected. In this regard, because the shutter speed is set at a high level, the presence of camera shake will not blur the photograph.

However, if no corresponding program exists for setting such a programmed exposure, selector means 15 switches the mode to the focal-plane shutter mode. In such case, switching circuit 107 supplies a signal to sequential control circuit SC so that the corresponding shutter speed is assigned to focal-plane shutter 11 and the corresponding aperture size is assigned to lens shutter 8.

In response to this set mode of operation, arithmetic circuit 105 supplies an output signal at output Q2 to sequential control circuit SC to set the exposure level according to the brightness of the subject to be photographed.

The manner of operation of electronic circuit 110 is identical to that described above with respect to FIGS. 3 and 4, and a detailed description thereof will accordingly be omitted herein.

Figure 7:
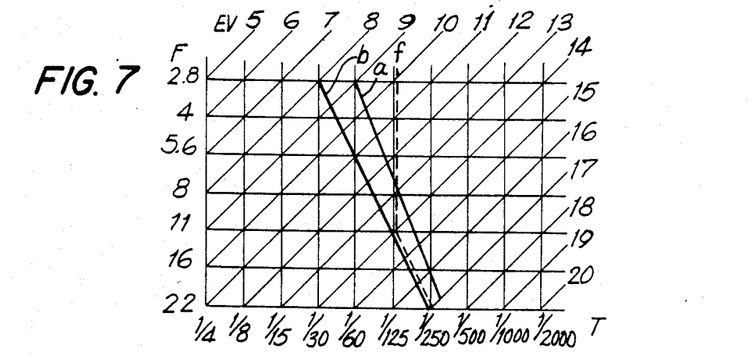
FIG. 7 is a graphical diagram illustrating the programmed operation performed by the control circuit of FIG. 6.

As discussed above, electronic circuit 110 is intended to provide adjustment to prevent blurring of the photograph due to camera shake. Referring to FIG. 7, one mode of performing such operation will now be described. Specifically, and by way of example, it is assumed that the brightness of the subject to be photographed is EV 11 and the long-focus or telephoto lens is selected. In such case, regardless of whether lens shutter 8 is activated along line a or line b, arithmetic circuit 105 determines that the shutter speed T is less than 1/125 second, and determines that camera shake will blur the photograph. Accordingly, switching circuit 107 switches the operation to the focal-plane shutter mode by supplying an appropriate output signal to sequential control circuit SC. As a result, sequential control circuit SC controls driving means D1 and D2 so that focal-plane shutter 11 is activated to perform the exposure operation along the broken line in FIG. 7.

For example, selector means 15 selects a lens shutter mode along line b of FIG. 7 when a brightness of a subject corresponds to EV 10. However, the shutter speed of programmed exposure b is slow and camera shake will occur. Therefore, means 105 produces a signal corresponding to a programmed exposure a. However, shutter speed on line a is less than the lowest permissible speed 1/125, and therefore the switching means 107 delivers a signal to sequential control circuit means SC. Accordingly, a shutter speed of 1/125 is assigned to the focal plane shutter, and the aperture F2.8 is assigned to the lens shutter.

Thus, with electronic circuit 110 according to the present invention, selector means 15 determines whether lens shutter 8 or focal-plane shutter 11 is operated. If the subject is so dark that lens shutter 8 will be unable to avoid the problem of camera shake, the focal-plane shutter mode is automatically selected in accordance with the discussion above of FIG. 7. Thus, sequential control circuit SC activates lens shutter 8 and focal-plane shutter 11 with respective timings therebetween. Accordingly, effective use is made of the functions of both shutters.

Figure 8:
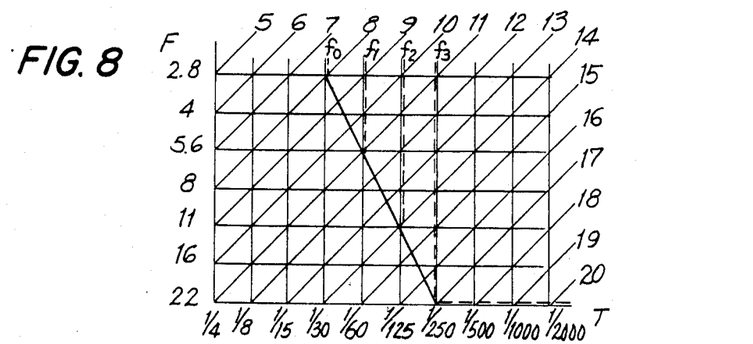

Referring now to FIG. 8, another manner of preventing photographic blur due to camera shake with electronic circuit 110 will now be described. Specifically, FIG. 8 is a graphical diagram illustrating the programmed operation in which the speed of the focal-plane shutter is switched to other values corresponding to focal-lengths $f_0$, $f_1$, $f_2$, $f_3$, of lens 2 as indicated by the broken lines. As shown therein, when the operation mode is set to the focal-plane shutter mode by selector means 15 and the shutter speed of focal-plane shutter 11 is set to 1/60 second, the shutter speed is automatically switched by switching circuit 107 to 1/250 second corresponding to focal-length $f_3$ of lens 2.

It is noted that it is possible to fabricate a single-lens reflex camera with electronic circuit 110.

Further, it will be appreciated that electronic circuits 10 and 110 can be combined into a single circuit.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined by the appended claims.

What is claimed is:

1. A camera system of the type having a lens shutter for performing a programmed exposure operation with a programmed exposure value and a diaphragm-adjusting operation, a focal-plane shutter and an aperture defined by said lens shutter and through which an image of a subject to be photographed is passed for recording on a photosensitive material, said camera system comprising:

(a) operation mode setting means for setting an operation mode of said camera system to one of the following modes:
      (i) a lens shutter mode in which the lens shutter is operated as a programmed shutter, and
      (ii) a focal-plane shutter mode in which shutter speed is controlled by the focal-plane shutter and the aperture of the camera system is controlled by said lens shutter;

(b) selector means for controlling said setting means to set the operation mode of said camera system to one of the lens shutter mode and the focal-plane shutter mode; and (c) switching means for controlling said setting means to switch the operation mode of the camera system to the focal-plane shutter mode irrespective of the setting of the selector means when an exposure value to be controlled exceeds the programmed exposure value of the lens shutter.

2. A camera system according to claim 1, wherein said operation mode setting means includes:

(a) first driving means for controlling at least one of the following:
  (i) the exposure value of the lens shutter, and
  (ii) the aperture defined by said lens shutter;
(b) second driving means for controlling the time during which the focal-plane shutter is operated; and
(c) sequential control means for controlling said first and second driving means in response to said selector means and said switching means.

3. A camera system according to claim 1, wherein said lens shutter includes a plurality of blades which define said aperture.

4. A camera system according to claim 3, further including motor means for activating said blades in response to said first driving means.

5. A camera system according to claim 1, further comprising a camera lens and arithmetic means for supplying an output signal to said switching means in response to the brightness of the subject to be photographed, the distance of said camera system to the subject to be photographed, a focal length of said lens and sensitivity of the photosensitive material on which an image of the subject to be photographed is to be recorded.

6. A camera system of the type having a lens shutter for performing a programmed exposure operation with a programmed exposure value and a diaphragm-adjusting operation, a focal-plane shutter, an aperture through which an image of a subject to be photographed is passed for recording on a photosensitive material and a camera lens, said camera system comprising:

(a) operation mode setting means for setting an operation mode of said camera system to one of the following modes:
  (i) a lens shutter mode in which the lens shutter is operated as a programmed shutter, and
  (ii) a focal-plane shutter mode in which shutter speed is controlled by the focal-plane shutter and the aperture of the camera system is controlled by said lens shutter;
(b) selector means for controlling said setting means to set the operation mode of said camera system to one of the lens shutter mode and the focal-plane shutter mode;
(c) focal length setting means for setting the focal length of the camera lens; and
(d) switching means for controlling said setting means to switch one of:
  (i) the operation mode of the camera system from one mode to the other mode, and
  (ii) the shutter speed of the camera system set by the selector means to another shutter speed,
in accordance with the focal length set by said focal length setting means, to prevent photographic blurring during camera shake.

7. A camera system according to claim 6, wherein said operation mode setting means includes:

(a) first driving means for controlling at least one of the following:
  (i) the exposure value of the lens shutter, and
  (ii) the aperture defined by said lens shutter;
(b) second driving means for controlling the time during which the focal-plane shutter is operated; and
(c) sequential control means for controlling said first and second driving means in response to said selector means and said switching means.

8. A camera system according to claim 6, wherein said lens shutter includes a plurality of blades which define said aperture.

9. A camera system according to claim 8, further including motor means for activating said blades in response to said first driving means.

10. A camera system according to claim 6, further comprising arithmetic means for supplying an output signal to said switching means in response to the brightness of the subject to be photographed, the distance of said camera system to the subject to be photographed, a focal length of said lens and sensitivity of the photosensitive material on which an image of the subject to be photographed is to be recorded.

11. A camera system according to claim 6, wherein said camera lens is a multifocus lens.

12. A camera system according to claim 6, wherein said switching means includes memory means for storing information regarding a lowest permissible shutter speed for each focal length, and said camera system further includes arithmetic means for comparing a present shutter speed with said lowest permissible shutter speed and for controlling said switching means in response thereto.

13. A camera system of the type having a lens shutter for performing a programmed exposure operation with a programmed exposure value and a diaphragm-adjusting operation, a focal-plane shutter, an aperture through which an image of a subject to be photographed is passed for recording on a photosensitive material and a camera lens, said camera system comprising:

(a) operation mode setting means for setting an operation mode of said camera system to one of the following modes:
  (i) a lens shutter mode in which the lens shutter is operated as a programmed shutter, and
  (ii) a focal-plane shutter mode in which shutter speed is controlled by the focal-plane shutter and the aperture of the camera system is controlled by said lens shutter;
(b) selector means for controlling said setting means to set the operation mode of said camera system to one of the lens shutter mode and the focal-plane shutter mode;
(c) focal length setting means for setting the focal length of the camera lens; and
(d) switching means for controlling said setting means to switch the operation mode of the camera system to the focal-plane shutter mode irrespective of the setting of the selector means when an exposure value to be controlled exceeds the programmed exposure value of the lens shutter and to switch one of:
  (i) the operation mode of the camera system from one mode to the other mode, and
  (ii) the shutter speed of the camera system set by the selector means to another shutter speed,
in accordance with the focal length set by said focal length setting means, to prevent photographic blurring during camera shake.

* * * * *